United States Patent
Wang et al.

(10) Patent No.: US 10,067,566 B2
(45) Date of Patent: Sep. 4, 2018

(54) SYSTEMS AND METHODS FOR A SHARED HAPTIC EXPERIENCE

(71) Applicant: Immersion Corporation, San Jose, CA (US)

(72) Inventors: Yiting Wang, San Jose, CA (US); Danny Grant, Laval (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/219,882

(22) Filed: Mar. 19, 2014

(65) Prior Publication Data
US 2015/0268722 A1 Sep. 24, 2015

(51) Int. Cl.
| | | |
|---|---|---|
| G06F 3/01 | (2006.01) | |
| A63F 13/216 | (2014.01) | |
| A63F 13/33 | (2014.01) | |
| A63F 13/843 | (2014.01) | |
| A63F 13/285 | (2014.01) | |
| A63F 13/65 | (2014.01) | |

(52) U.S. Cl.
CPC ............ *G06F 3/016* (2013.01); *A63F 13/216* (2014.09); *A63F 13/285* (2014.09); *A63F 13/33* (2014.09); *A63F 13/843* (2014.09); *A63F 13/65* (2014.09); *A63F 2300/1037* (2013.01)

(58) Field of Classification Search
CPC ..... G06F 3/016; G06F 2203/013; G08B 6/00; A63F 13/12; A63F 2300/1037; A63F 13/285; A63F 13/25; A63F 13/26; A63F 13/847
See application file for complete search history.

(56) References Cited

U.S. PATENT DOCUMENTS

| 8,502,651 B2 | 8/2013 | Birnbaum |
| 9,046,922 B2 | 6/2015 | Grant et al. |

(Continued)

FOREIGN PATENT DOCUMENTS

| WO | WO 2005/032070 | 4/2005 |
| WO | WO 2013/0134388 | 9/2013 |

OTHER PUBLICATIONS

European Patent Office, European Search Report, Application No. 15158365, dated Jul. 29, 2015.

(Continued)

*Primary Examiner* — Benjamin C Lee
*Assistant Examiner* — Dong Hui Liang
(74) *Attorney, Agent, or Firm* — Kilpatrick Townsend & Stockton LLP (57) ABSTRACT

One illustrative system disclosed herein includes a processor configured to: receive a first haptic effect signal, the first haptic effect signal based at least in part on a haptic event and adapted to cause a first haptic effect to be output by a first haptic output device to a first user, determine a second haptic effect based at least in part on the first haptic effect and a characteristic independent of the haptic event, generate a second haptic effect signal based at least in part on the second haptic effect, and transmit the second haptic signal to a second haptic output device. In the illustrative system, the second haptic output device is in communication with the processor, and the second haptic output device is configured to receive the second haptic effect signal and output the second haptic effect to a second user.

38 Claims, 6 Drawing Sheets

(56) References Cited

U.S. PATENT DOCUMENTS

| | | | | |
|---|---|---|---|---|
| 2002/0142701 A1* | 10/2002 | Rosenberg | ............ | G05D 1/005 446/454 |
| 2003/0135203 A1* | 7/2003 | Wang | ................ | A61B 19/22 606/1 |
| 2006/0223637 A1* | 10/2006 | Rosenberg | ............. | A63F 13/10 463/47 |
| 2008/0294984 A1* | 11/2008 | Ramsay | ............... | G06F 1/1626 715/702 |
| 2009/0091479 A1* | 4/2009 | Sinha | ................... | G06F 3/016 341/22 |
| 2009/0096632 A1* | 4/2009 | Ullrich | ............... | H04N 9/8205 340/4.21 |
| 2010/0045619 A1 | 2/2010 | Birnbaum et al. | | |
| 2011/0021272 A1* | 1/2011 | Grant | ................... | A63F 13/10 463/30 |
| 2011/0115709 A1 | 5/2011 | Cruz-Hernandez et al. | | |
| 2011/0181403 A1* | 7/2011 | Cruz-Hernandez | ...... | G08B 6/00 340/407.1 |
| 2011/0187498 A1* | 8/2011 | Flaherty | ................ | G05B 19/00 340/5.72 |
| 2011/0309918 A1* | 12/2011 | Ramsay | ................ | G08B 29/24 340/407.1 |
| 2012/0068835 A1* | 3/2012 | Li | ........................ | G06F 3/016 340/407.2 |
| 2012/0232780 A1* | 9/2012 | Delson | ................... | A63F 13/06 701/400 |
| 2013/0038603 A1* | 2/2013 | Bae | ....................... | G06F 3/016 345/419 |
| 2013/0198625 A1 | 8/2013 | Anderson et al. | | |
| 2015/0072789 A1 | 3/2015 | Heubel et al. | | |
| 2017/0263259 A1* | 9/2017 | Tsukagoshi | ........ | G10L 19/018 |

OTHER PUBLICATIONS

European Patent Office, Communication pursuant to Article 94(3) EPC, Application No. 15158365, dated Jun. 16, 2016.

\* cited by examiner

SYSTEMS AND METHODS FOR A SHARED HAPTIC EXPERIENCE

FIELD OF THE INVENTION

The present invention relates to the field of user interface devices. More specifically, the present invention relates to systems and methods for providing a shared haptic experience.

BACKGROUND

Computer users continue to desire a more interactive experience. For example, as video games become more interactive, demand for multiplayer games, wherein users can play with or against each other, has increased. Users may play video games with or against each other in a multitude of ways. One common way for users to play multiplayer games is through a single game console, such as a SONY PLAYSTATION®, in which all the users are located in close proximity to one another, often the same room, and manipulate virtual characters through handheld controllers connected to the game console. Users also commonly play multiplayer games over the Internet, wherein users play with or against each other from sometimes remote corners of the world, often via different kinds of devices, such as computers, game consoles, and smart phones. Some multiplayer games and game systems may allow players to share audio and video content with one another. While various techniques have been used to improve the multiplayer gaming experience, there is a need for multiplayer games, game systems, and similar collaborative computing environments to allow users to share their haptic content in order to enhance the interactive and collaborative nature of the system.

SUMMARY

Embodiments of the present disclosure comprise systems and methods for providing a shared haptic experience. In one embodiment, a system of the present disclosure may comprise a processor configured to: receive a first haptic effect signal, the first haptic effect signal based at least in part on a haptic event and adapted to cause a first haptic effect to be output to a first user, determine a second haptic effect based at least in part on the first haptic effect and a characteristic independent of the haptic event, generate a second haptic effect signal based at least in part on the second haptic effect, and transmit the second haptic signal to a second haptic output device. The system may further comprise a second haptic output device in communication with the processor, wherein the second haptic output device is configured to receive the second haptic effect signal and output the second haptic effect to a second user.

In another embodiment, a method of the present disclosure may comprise: receiving a first haptic effect signal, the first haptic effect signal based at least in part on a haptic event and adapted to cause a first haptic effect to be output to a first user, determining a second haptic effect based at least in part on the first haptic effect and a characteristic independent of the haptic event, generating a second haptic effect signal based at least in part on the second haptic effect, and transmitting the second haptic signal to a second haptic output device. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of a Device for Providing a Shared Haptic Experience

One illustrative embodiment of the present disclosure comprises a gaming system configured to provide a shared haptic experience. The gaming system includes one or more game consoles or other computing systems that are in communication with user interface devices, such as a game controller, smart phone, or tablet. Such gaming systems may include, for example, the MICROSOFT XBOX®, SONY PLAYSTATION®, NINTENDO WII™, or the SEGA® ZONE. The user interface devices may comprise and/or may be in communication with one or more user input elements. Such elements may include, for example, a button, joystick, camera, gyroscope, accelerometer, or touch-sensitive surface, any of which can be used to detect a user input alone or in combination with one another.

In the illustrative embodiment, the user input device also comprises and/or may be in communication with one or more haptic output devices. The haptic output device receives a signal from the gaming system and outputs a haptic effect to a user. Each haptic output device may include one or more actuators, such as an eccentric rotating mass (ERM) motor for providing a vibratory effect.

In the illustrative embodiment, a first user interacts with the gaming system through a user input device, such as a game controller, to control the actions of an avatar on the screen during a game. For example, if the first user is playing a first-person shooting game, then the first user controls the first user's character to achieve some goal, such as advancing through a level. As events occur in the game, the first user may experience one or more haptic effects in response to the game events. For example, in one embodiment, the first user's virtual character gets shot, and in response, a haptic effect, such as a vibration, is output to the first user's controller.

As video games become more interactive, demand for multiplayer games, wherein users can play with or against each other, has increased. Users may play video games with or against each other in a multitude of ways. Users commonly play multiplayer video games with or against one another via a single game console or over the Internet. Some users may wish to share haptic feedback that they experience with one or more other users.

In the illustrative embodiment, the gaming system is adapted to share the first user's haptic effects with one or more other users. In the illustrative embodiment, the characteristics of the haptic effect transmitted to a second user are based, at least in part, on the haptic effect generated for the first user and on other factors. For example, the gaming system may generate an effect to be delivered to the second user by starting with the haptic effect generated for the first user and modifying that effect based on the relative position of the first user's virtual character to the second user's virtual character in the video game. In one such embodiment, the strength of the haptic effect transmitted to the second user is inversely proportional to the relative distance between the first user's virtual character and the second user's virtual character in virtual space. That is, if the first user's virtual character is standing ten feet from the second user's virtual character in the video game, the haptic effect transmitted to the second user is weaker than if the first user's virtual character was standing three feet from the second user's virtual character.

The description of the illustrative embodiment above is provided merely as an example, not to limit or define the limits of the present subject matter. Various other embodiments of the present invention are described herein and variations of such embodiments would be understood by one of skill in the art. As will be discussed in further detail below, such embodiments are not limited to gaming systems, and the systems and methods described herein for generating haptic effects can be modified in any number of ways. Advantages offered by various embodiments may be further understood by examining this specification and/or by practicing one or more embodiments of the claimed subject matter.

Illustrative Systems for a Device for Providing a Shared Haptic Experience

Figure 1:
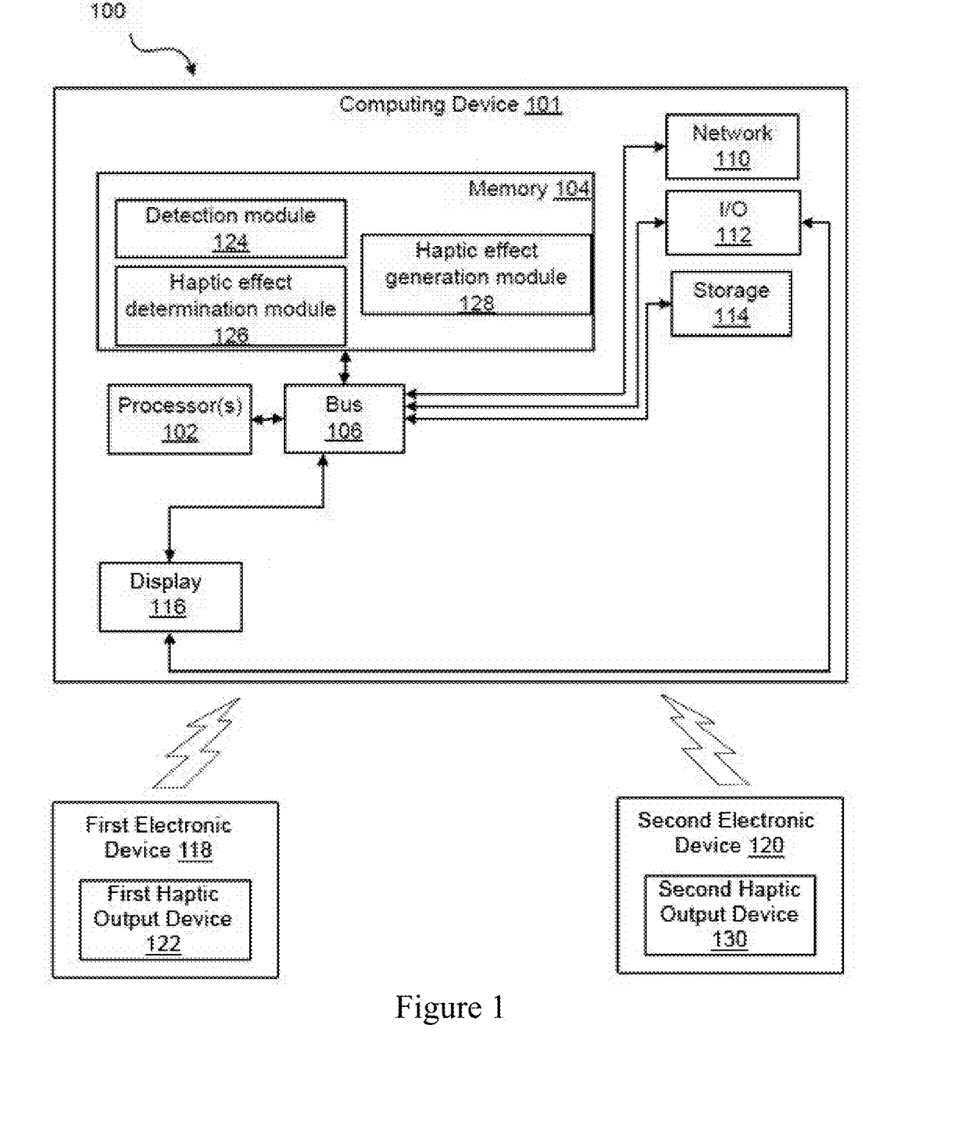
FIG. 1 is a block diagram showing a system for providing a shared haptic experience in one embodiment.

FIG. 1 is a block diagram showing a system 100 for providing a shared haptic experience in one embodiment. In this example, system 100 comprises a computing device 101 having a processor 102 in communication with other hardware via bus 106. A memory 104, which can comprise any suitable tangible (and non-transitory) computer-readable medium such as RAM, ROM, EEPROM, or the like, embodies program components that configure operation of the computing device 101. In this example, computing device 101 further comprises one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, keyboards, mice, joysticks, video game controllers, buttons, speakers, microphones, and/or other hardware used to input data or output data. Storage 114 represents nonvolatile storage such as magnetic, optical, or other storage media included in device 101. Display 116 may be used to facilitate the output of one or more images, and may comprise, for example, a television set, a touchscreen display, a computer monitor, or a projector.

In this example, computing device 101 is in communication with two external electronic devices (hereinafter "external devices"), first electronic device 118 and second electronic device 120. In some embodiments, computing device 101 may be in communication with any number of external electronic devices. In some embodiments, these external devices may be similar, such as game controllers for use with a single game console, like a SONY PLAYSTATION®. In other embodiments, the external devices may be of different types, such as smart phones, tablets, e-readers, laptop computers, desktop computers, or wearable devices. While computing device 101 and first electronic device 118 are illustrated in FIG. 1 as separate devices, the computing device 101 and first electronic device 118 may comprise a single integrated device capable of performing the functions described in relation to computing system 101 as well as serving as an input and output device for the user.

First electronic device 118 and second electronic device 120 comprise a first haptic output device 122 and a second haptic output device 130, respectively. These haptic output devices may be configured to output haptic effects, for example, vibrations, changes in a perceived coefficient of friction, simulated textures, or surface deformations in response to haptic signals. Additionally or alternatively, haptic output devices 122 and 130 may provide haptic effects that move the surfaces of the external devices in a controlled manner. In some embodiments, haptic effects may utilize an actuator coupled to a housing of the external devices, and some haptic effects may use multiple actuators in sequence and/or in concert. For example, in one embodiment, a surface texture is simulated or the perceived coefficient of friction is varied (e.g., decreased or increased) by vibrating the surface of the external devices at different frequencies. In such an embodiment, haptic output devices 122 and 130 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In other embodiments, haptic output devices 122 and 130 may use electrostatic attraction, for example by use of an electrostatic surface actuator, to simulate a texture or to vary the coefficient of friction the user feels when moving his or her finger across the surface of the external devices. For example, in one embodiment, haptic output devices 122 and 130 comprise a device that applies voltages and currents instead of mechanical motion to generate a haptic effect. In such an embodiment, the electrostatic actuator comprises a conducting layer and an insulating layer. In such an embodiment, the conducting layer may be any semiconductor or other conductive material, such as copper, aluminum, gold, or silver. And the insulating layer may be glass, plastic, polymer, or any other insulating material. Furthermore, the processor 102 may operate the electrostatic actuator by applying an electric signal to the conducting layer. In some embodiments, the electric signal may be an AC signal that is generated by a high-voltage amplifier. In some embodiments, the AC signal may capacitively couple the conducting layer with an object near or touching the surface of the external devices. The capacitive coupling may simulate a friction coefficient or texture on the surface of the external devices.

For example, in one embodiment, the surface of first electronic device 118 is smooth, but the capacitive coupling may produce an attractive force between an object, such as a user's hand, and the surface of first electronic device 118. In some embodiments, varying the levels of attraction between the object and the conducting layer can create or vary a simulated texture on an object moving across the surface of the external devices. Furthermore, in some embodiments, an electrostatic actuator may be used in conjunction with traditional actuators to create or vary a simulated texture on the surface of the external devices.

One of ordinary skill in the art will recognize that, in addition to vibrating or varying the coefficient of friction on a surface, other techniques or methods can be used to output haptic effects. For example, in some embodiments, haptic effects may be output using a flexible surface layer configured to vary its texture based upon contact from a surface reconfigurable haptic substrate (including, but not limited to, e.g., fibers, nanotubes, electroactive polymers, piezoelectric elements, or shape memory allows) or a magnetorheological fluid. In another embodiment, haptic effects may be output by raising or lowering one or more surface features, for example, with a deforming mechanism, air or fluid pockets, local deformation of materials, resonant mechanical elements, piezoelectric materials, micro-electromechanical systems ("MEMS") elements, thermal fluid pockets, MEMS pumps, variable porosity membranes, or laminar flow modulation.

Although in this example first haptic output device 122 is embedded in a device external from computing device 101, i.e. first electronic device 118, in other embodiments first haptic output device 122 may be embedded within computing device 101. For example, computing device 101 may comprise a laptop computer further comprising first haptic output device 122. Also, while first and second haptic output devices 122 and 130 are depicted as single devices, each haptic output device may comprise one or more haptic output devices. For example, first haptic output device 122 may comprise two or more actuators to provide different types of effects to a user. It will be recognized by those of ordinary skill in the art that other embodiments may contain additional configurations of the first haptic output device 122, second haptic output device 130, and computing system 101.

Turning to memory 104, illustrative program components 124, 126, and 128 are depicted to illustrate how a device can be configured in some embodiments to provide a shared haptic experience. In this example, detection module 124 configures processor 102 to monitor a virtual environment, such as a video game environment, for a haptic event, such as a virtual gun shot. For example, module 124 may sample videogame data to track the presence of a haptic event and, if a haptic event is present, to track one or more of the type, duration, location, intensity, and/or other characteristics of the haptic event. Further, in some embodiments, detection module 124 configures processor 102 to monitor the virtual environment for the receipt of haptic content from other players or for the triggering of a sharing event, such as a button press, which may indicate that computing device 101 should replicate (i.e., generate substantially the same effect as) another user's haptic content. For example, module 124 may sample network 110 data to track the presence of another user's shared haptic content. In such an embodiment, if another user's shared haptic content is present, detection module 124 may track one or more of the type, duration, location, and/or other characteristics of the one or more haptic effects.

Haptic effect determination module 126 represents a program component that analyzes data regarding the shared haptic effect in order to determine a haptic effect to locally generate. Particularly, haptic effect determination module 126 may comprise code that determines, based on the type, duration, location, and/or other characteristics of the shared haptic content, a haptic effect to locally output. Haptic effect determination module 126 may further base this determination on the relative position of a first user to a second user in real space, the relative position of a first user to a gaming device in real space, the relative position of a virtual character controlled by a first user to a virtual character controlled by a second user in a virtual environment, or a variety of other real or virtual environmental characteristics. For example, if the shared haptic effect comprises a long, intense (e.g., high magnitude) vibration, haptic effect determination module 126 may determine that, because of a large distance between a first user's virtual character and a second user's virtual character, the proper effect to output to the second user is a short, mild vibration.

In some embodiments, haptic effect determination module 126 may comprise code that determines which actuators to use in order to generate the haptic effect. For example, in some embodiments, the second user's gaming device may comprise four actuators; two actuators vertically aligned on the left side of the gaming device and two actuators vertically aligned on the right side of the user's gaming device. In such an embodiment, haptic effect determination module 126 may determine that because a first user's virtual character is positioned northwest of a second user's virtual character in a virtual environment, only the actuator in the front, left side of the second user's gaming device should be actuated to generate the haptic effect.

In some embodiments, haptic effect determination module 126 may comprise code that determines how best to output a local haptic effect that is substantially similar to the shared haptic content. For example, if the shared haptic content comprises a series of vibrations of varying intensity, haptic effect determination module 126 may determine how best to locally output an effect that is substantially similar to a series of vibrations of varying intensity. In such an embodiment, for example, haptic effect determination module 126 may determine that first electronic device 118 does not have the vibratory hardware, such as an ERM or LRA, to directly implement a series of vibrations. In one such embodiment, haptic effect determination module 126 may determine that the closest sensation to a series of vibrations of varying intensity that can be output is a series of changes in the coefficient of friction at the surface of the first electronic device 118 via an ESF actuator.

Haptic effect generation module 128 represents programming that causes processor 102 to generate and transmit a haptic signal to a haptic output device, such as first haptic output device 122, to generate the determined haptic effect. For example, generation module 128 may access stored waveforms or commands to send to first haptic output device 122. As another example, haptic effect generation module 128 may receive a desired type of effect and utilize signal processing algorithms to generate an appropriate signal to send to first haptic output device 122. As a further example, a desired texture may be indicated to be output at the surface of first electronic devices 118, along with target coordinates for the texture, and an appropriate waveform sent to one or more actuators to generate appropriate displacement of the surface of first electronic devices 118 (and/or other device components) to provide the texture. Such an embodiment may be particularly applicable wherein the first electronic device 118 comprises a touch screen display, such as a smart phone. Some embodiments may utilize multiple haptic output devices in concert to generate the haptic effect. For instance, first haptic output device 122 may comprise a plurality of haptic output devices, wherein in order to generate a desired effect, one haptic output device changes the perceived coefficient of friction at the surface of the first electronic device 118 while another haptic output device vibrates the surface of the first electronic device 118.

Figure 2:
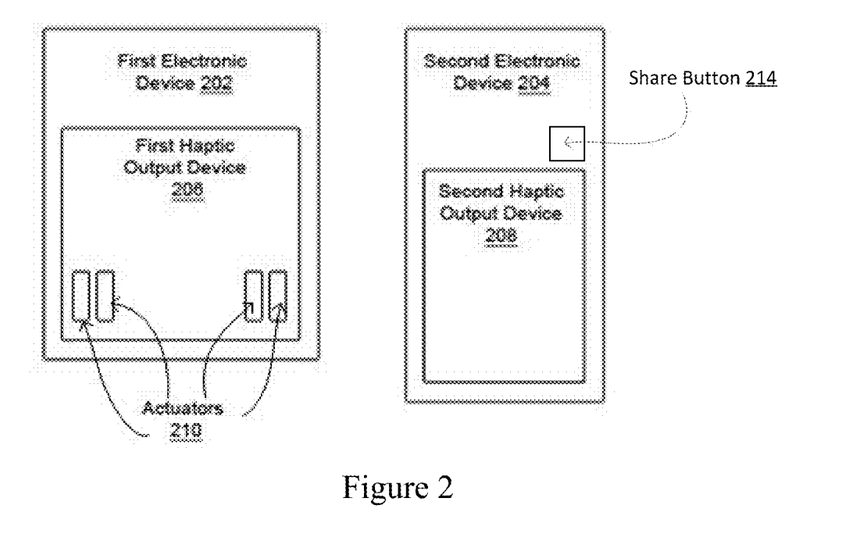
FIG. 2 is another block diagram showing one embodiment of a system for providing a shared haptic experience.

FIG. 2 is another block diagram showing one embodiment of a system for providing a shared haptic experience. The system comprises a first electronic device 202 and a second electronic device 204. In some embodiments, the system may comprise any number of electronic devices. In some embodiments, a first user may use first electronic device 202 to control a virtual character in a videogame, and a second user may use second electronic device 204 to control a different virtual character in the videogame. Second electronic device 204 comprises a "share" button 214 for triggering sharing of the second user's haptic content with the first user. First electronic device 202 comprises a first haptic output device 206, which in turn comprises actuators 210 for outputting a haptic effect. Likewise, second electronic device 202 comprises a second haptic output device 208, which in turn comprises actuators (not shown) for outputting a haptic effect. In this example, first haptic output device 206 comprises two actuators on the right side of first electronic device 202 and two actuators on the left side of first electronic device 202. Further, the two actuators on each side of first electronic device 202 are horizontally aligned. In other embodiments, the two actuators on each side of first electronic device 202 may be vertically aligned. In some embodiments, actuators 210 may be of a similar type. In other embodiments, actuators 210 may be of different types. It will be recognized by those skilled in the art that any number, type, and arrangement of such actuators may be possible.

In some embodiments, first electronic device 202 may be different in type from second electronic device 204. For example, in one such embodiment, first electronic device 202 comprises a smart phone and second electronic device 204 comprises a game console controller. In other embodiments, first electronic device 202 and second electronic device 204 may be any combination of laptop computers, game consoles, desktop computers, smart phones, tablets, e-readers, portable gaming systems, game console controllers, personal digital assistants, or other electronic devices. Consequently, in some embodiments, first haptic output device 206 and/or actuators 210 may be of a different type than second haptic output device 208 and/or actuators contained therein. For example, in one such embodiment, first haptic output device 206 comprises a series of ERMs, while second haptic output device 208 comprises a mechanism for deforming the surface of second electronic device 204.

Figure 3:
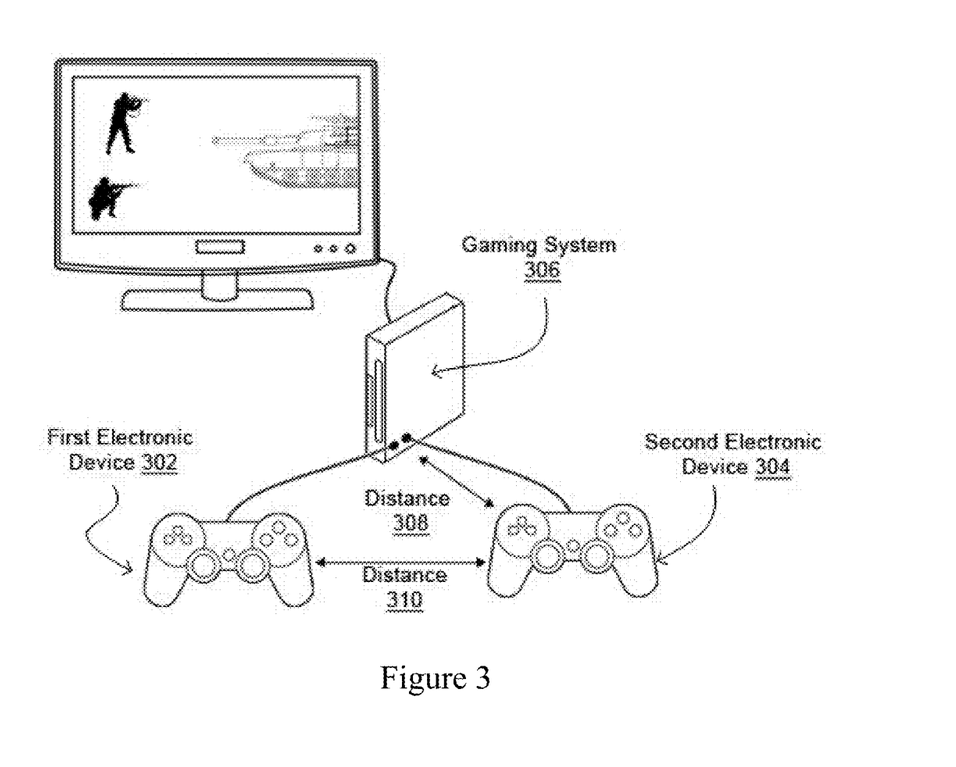
FIG. 3 shows an external view of a system for providing a shared haptic experience in one embodiment.

FIG. 3 shows an external view of a system for providing a shared haptic experience in one embodiment. In this example, the system comprises a first electronic device 302, here a game console controller, which comprises a first haptic output device. The first electronic device 302 is in communication with gaming system 306. In some embodiments, a first user may be playing, for example, an army game on gaming system 306. The first user may control a virtual marine using first electronic device 302. Likewise, a second user may also be playing the army game via second electronic device 304, here also a game console controller, and through which he or she can control his or her own virtual marine.

In such an embodiment, gaming system 306 may output various haptic effects to second electronic device 304 as the second user plays the army game. For example, if the second user's virtual character gets shot, gaming system 306 may cause second electronic device 304 to vibrate. In some embodiments, the first user controlling first electronic device 302 may receive modified versions of the haptic effects sent to the second user. In some such embodiments, first electronic device 302 may output haptic effects modified based on the relative position of first electronic device 302 to second electronic device 304 in real space. For example, in one embodiment, first electronic device 302 outputs haptic effects with strengths inversely proportional to the relative distance 310 between the first electronic device 302 and second electronic device 304 in real space. That is, in such an embodiment, as the distance 310 between the two electronic devices increases, the strength of the haptic effect output to first electronic device 302 decreases proportionately. In other embodiments, first electronic device 302 may output haptic effects modified based on the relative position of second electronic device 304 to gaming system 306 in real space. For example, in one such embodiment, first electronic device 302 outputs haptic effects with strengths inversely proportional to the relative distance 308 between second electronic device 304 and gaming system 306 in real space. Thus, if the first user is holding second electronic device 304 ten feet from the gaming system 306, the haptic effect transmitted to the first user is weaker than if the second user was holding second electronic device 304 three feet from the gaming system 306.

Figure 4:
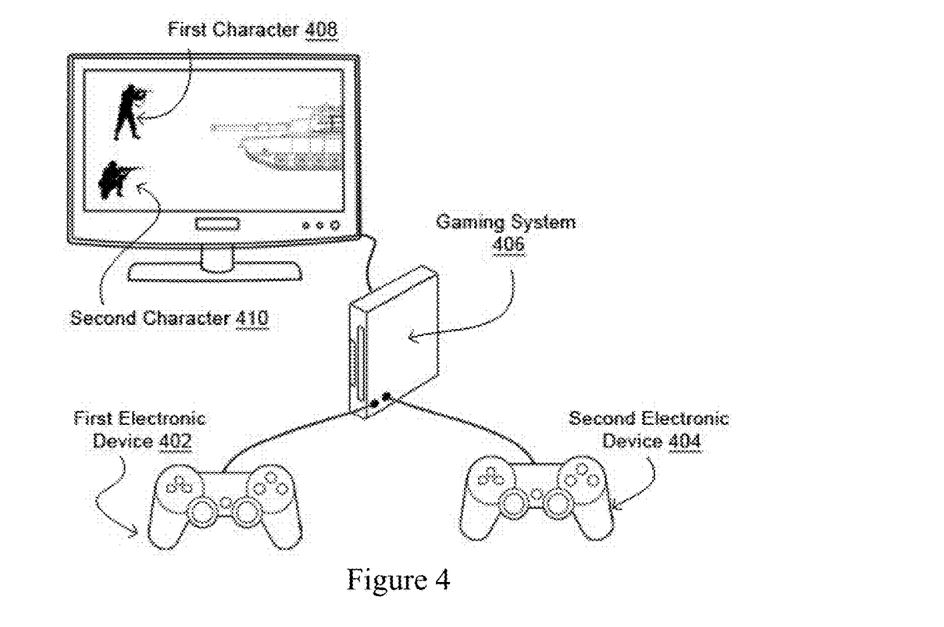
FIG. 4 shows another external view of a system for providing a shared haptic experience in one embodiment.

FIG. 4 shows another external view of a system for providing a shared haptic experience in one embodiment. In this example, the system comprises a first electronic device 402, here a game console controller, which comprises a first haptic output device 122. The first electronic device 402 is in communication with gaming system 406. In some embodiments, a first user may be playing, for example, an army game on gaming system 406. The first user may control a first character 408 in the game, here a marine, using first electronic device 402. Likewise, a second user may also playing the army game on gaming system 406. The second user may control a second character 410 in the game using second electronic device 404, here also a game console controller, which comprises second haptic output device.

In such an embodiment, gaming system 406 may output various haptic effects to second electronic device 404 as the second user plays the army game. For example, if the second user's virtual character is near an explosion, gaming system 406 may cause second electronic device 404 to vibrate via second haptic output device 130. In some embodiments, the first electronic device 402 may output modified versions of the haptic effects sent to the second user. In some such embodiments, first electronic device 402 may output haptic effects modified based on the relative position of first character 408 to second character 410 in the virtual environment. For example, in one embodiment, first electronic device 402 outputs haptic effects with strengths inversely proportional to the relative virtual distance between first character 408 and second character 410. In such an embodiment, as the virtual distance between the two virtual characters increases, the strength of the haptic effect output to first electronic device 402 decreases proportionately.

In some embodiments, the first electronic device 402 may output versions of the haptic effects sent to the second user that are modified based on the relative size of first character 408 to second character 410 in a virtual environment. For example, if the first character 408 is standing and the second character 410 is kneeling or crawling, first electronic device 402 may output haptic effects with strengths that are intensified compared to those output by second electronic device 404. In another embodiment, first electronic device 402 may output intensified haptic effects if second character's 410 virtual size is larger than first character's 408 virtual size. For example, in one such embodiment, if second character 410 is a bear and first character 408 is an ant, and the second user's haptic effect is a light vibration in response to a virtual car driving by, first electronic device 402 will output a substantially intensified haptic effect, such as a long, intense vibration, due to the virtual size differential.

Figure 5:
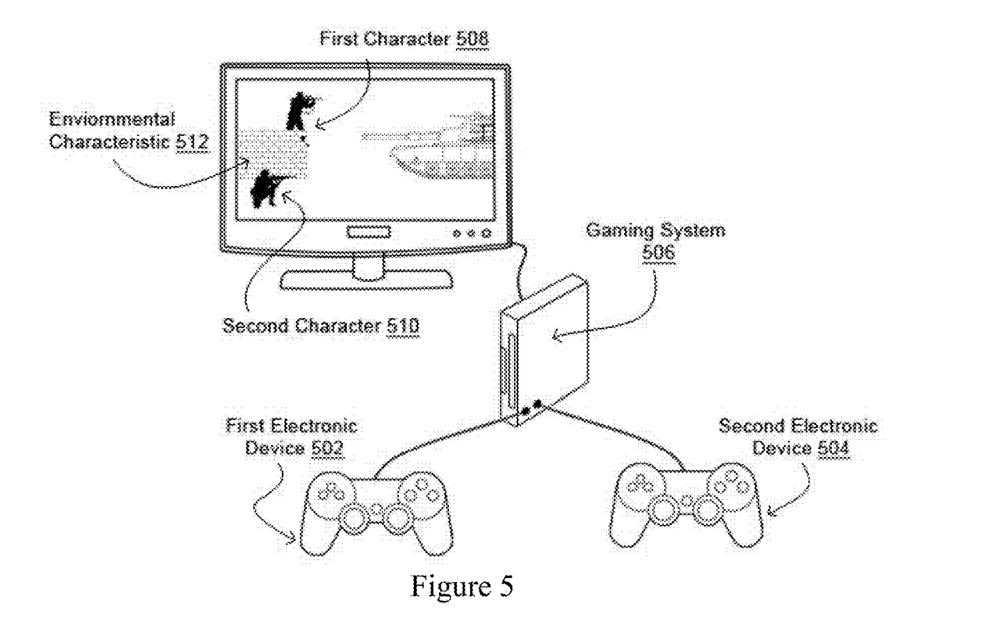
FIG. 5 shows one embodiment of an external view of a system for providing a shared haptic experience.

FIG. 5 shows one embodiment of an external view of system for providing a shared haptic experience. In this example, the system comprises a first electronic device 502, here a game console controller, which comprises a first haptic output device. The first electronic device 502 is in communication with gaming system 506. In some embodiments, a first user may be playing, for example, an army game on gaming system 506. The first user may control a first character 508 in the game, here a marine, using first electronic device 502. Likewise, a second user may also playing the army game on gaming system 506. The second user may control a second character 510 in the game using second electronic device 504, here also a game console controller, which comprises a second haptic output device.

In such an embodiment, gaming system 506 may output various haptic effects to second electronic device 504 as the second user plays the army game. For example, if the second user's virtual character is driving a virtual tank over a bumpy road, gaming system 506 may cause second haptic output device to vibrate. In some embodiments, first electronic device 502 may output modified versions of the haptic effects sent to the second user. In some such embodiments, the modifications may be based on a virtual environmental characteristic 512. In some embodiments, virtual environmental characteristic 512 may comprise one or more of a characteristic of an object or barrier, an ambient temperature, a characteristic of a barrier, a humidity level, or a density of a medium in which a character is located. In FIG. 5, environmental characteristic 512 comprises a barrier that is a virtual brick wall. In one such embodiment, first electronic device 502 may output versions of haptic effects sent to second electronic device 504 with dampened strengths because environmental characteristic 512, a brick wall, is positioned between first character 508 and second character 510. In another embodiment, environmental characteristic 512 may comprise the medium in which the first and/or second characters 508 or 510 are located. For instance, in one such embodiment, the first character 508 may be swimming in water while the second character 510 is on land. In such an embodiment, the haptic effect transmitted to the first electronic device 502 may be an dampened version of the haptic effect transmitted to the second electronic device 504 because water is denser than air.

In some embodiments, the environmental characteristic 512 may comprise physical properties, like the Doppler effect. For example, in one such embodiment, as second character 510 drives past first character 508 in a virtual car, first electronic device 502 outputs versions of haptic effects sent to second electronic device 504 with characteristics modified based on the Doppler effect. In another embodiment, environmental characteristic 512 may comprise a virtual ambient temperature or humidity. In such an embodiment, first electronic device 502 may output versions of haptic effects sent to second electronic device 504 with characteristics modified based on the virtual ambient temperature or humidity. For example, in one embodiment, first electronic device 502 outputs versions of haptic effects sent to second electronic device 504 with their strengths dampened because environmental characteristic 512 comprises high virtual humidity.

Although the environmental characteristic 512 shown in FIG. 5 is part of a virtual environment, in some embodiments, environmental characteristic 512 may be present in real space. In some embodiments, environmental characteristic 512 may comprise one or more of an ambient temperature, a characteristic of a barrier, a humidity level, or a density of a medium in real space. For example, in one embodiment, first electronic device 502 comprises a temperature sensor. In such an embodiment, first electronic device 402 can determine the temperature in real space, such as the room in which users are playing the army video game, and vary its haptic output based on the temperature determination. In some such embodiments, first electronic device 402 may output versions of haptic effects sent to second electronic device 504 modified based on the temperature in real space. Likewise, in some embodiments, first electronic device 502 may output versions of haptic effects sent to second electronic device 504 with characteristics modified based on a physical obstruction in real space, like a real brick wall between first electronic device 502 and second electronic device 504.

Figure 6:
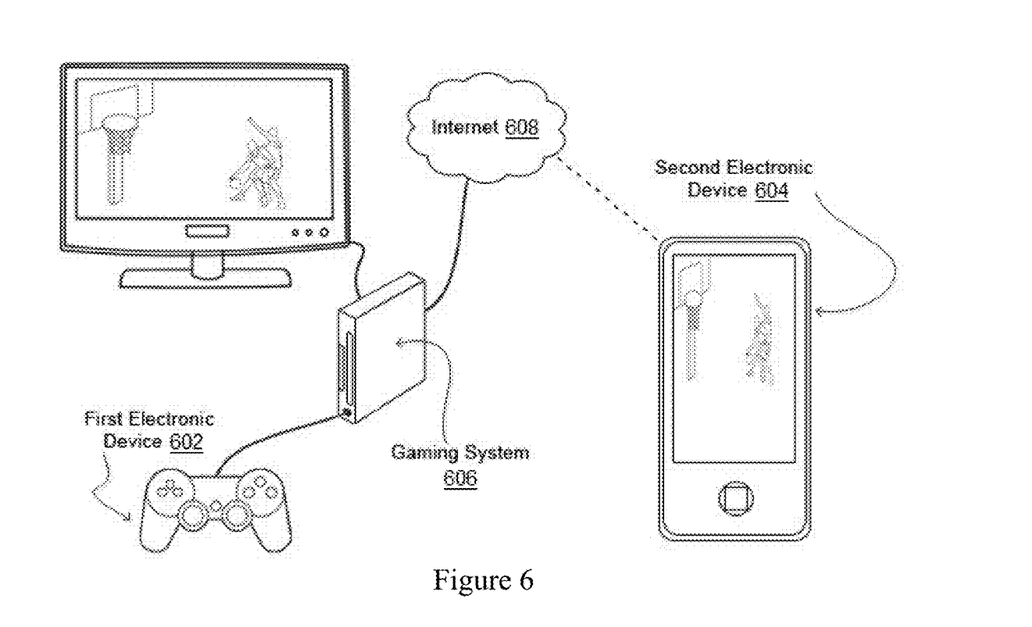
FIG. 6 shows an external view of a system for providing a shared haptic experience in one embodiment.

FIG. 6 shows an external view of system for providing a shared haptic experience in one embodiment. In this example, the system comprises a first electronic device 602, which in this example is a game console controller, in communication with a computing device, which in this example is a gaming system 606. Gaming system 606 is connected to the internet 608 for multiplayer gameplay. In some embodiments, a first user may be playing, for example, a basketball game on gaming system 606 and may control his virtual basketball player using first electronic device 602. Likewise, a second user may be playing the basketball game via a second electronic device 604, which in this example is a smartphone, such as an iPhone or Android phone. In this example, second electronic device 604 is wirelessly connected to the internet 608 for multiplayer gameplay. First electronic device 602 comprises a first haptic output device and second electronic device 604 comprises a second haptic output device.

In such an embodiment, gaming system 606 may output various haptic effects to first electronic device 602 as the first user plays the basketball game. For example, if the first user's virtual character takes a shot that bounces off the rim of the basketball net, gaming system 606 may cause first electronic device 602 to vibrate.

In one such embodiment, first electronic device 602 may comprise a "share" button, through which the first user may initiate the sharing of his haptic content with the second user. In such an embodiment, the first user may press a "share" button on a the first electronic device 602, indicating he or she wants to share his or her haptic feedback with a second user. Thereafter, the gaming system 606 may generate an effect to be delivered to the second electronic device 604 that is substantially the same as the effect that was delivered to the first electronic device 602. For example, in one embodiment, the second user may not actually be participating in playing the basketball game, but rather may be simply observing in order to learn how to play the game. In such an embodiment, the first user may press the "share" button on first electronic device 602, triggering haptic sharing among the two users. In such an embodiment, second electronic device 604 replicates any haptic effects delivered to first electronic device 602, such as vibrations, as a result of gameplay.

In other embodiments, the first user may share not only haptic content with the second user by pressing the "share button," but also his video data, audio data, and/or gameplay controls. In such an embodiment, the second user may take over control of the first user's virtual character and the first user may become an observer. In some such embodiments, second electronic device 604 may replicate any haptic effects delivered to first electronic device 602, such as vibrations, as a result of gameplay.

In some embodiments, a software-generated event, rather than a button press, may trigger sharing of a first user's haptic content with a second user. For example, in some embodiments, the game system 606 may initiate sharing of a first user's haptic feedback with a second user upon the death of the second user's virtual character in a multiplayer game. In another embodiment, the first user may be playing a virtual basketball game against the second user. If the second user commits a virtual fowl against the first user, the first user may be entitled to two "free throws," in which the first user may take unopposed shots from a "foul line" on the virtual basketball court. In response to the foul event, the game may disable the second user's controls and change the second user's virtual perspective to that of the first user while the first user is allowed to take his or her free throws. Further, in some embodiments, the change in virtual perspective may automatically trigger sharing of the first user's haptic content with the second user. In such an embodiment, if the first user takes a free throw and misses, the ball hitting the virtual basketball net's rim, the first electronic device 602 may output a haptic effect, such as a vibration. Likewise, because haptic sharing has been triggered, the second electronic device 604 outputs a similar haptic effect.

In some embodiments, the first user may press the "share" button on first electronic device 602, which may begin recording of his or her haptic content. In some embodiments, the second user may be able to trigger a playback event, such as by a button press, and subsequently play back the haptic content on second electronic device 604. In one such embodiment, second electronic device 604 replicates the saved haptic content as closely as possible. For example, a first user may press a "share" button on a game controller indicating he or she wants to share his or her haptic content with a second user. Thereafter, haptic content (e.g., haptic effects) generated for the first user are recorded. Upon the occurrence of a playback event, such as a software-generated event, the saved haptic content is delivered to the second user. In some embodiments, the first user's audio and/or video content may be recorded in addition the first user's haptic content when he or she presses the "share button." Upon the occurrence of a playback event, the saved haptic content as well as the saved audio and/or video content may be delivered to the second user.

It should be recognized that although the embodiments shown in FIGS. 3-6 depict only a first electronic device 302 and a second electronic device 303, in some embodiments, a plurality of such devices may be used to output haptic effects of the types described throughout this specification.

Additional Embodiments of Systems for Providing a Shared Haptic Experience

In some embodiments, the system may comprise one or more automobiles. In some such embodiments, a first user may be, for example, driving a first automobile on the highway. The first user may control the first automobile via a steering wheel, which may comprise a first haptic output device. The first automobile is in communication with the first haptic output device. Likewise, a second user may also be driving a second automobile on the highway. The second user may control the second automobile via a steering wheel, which may comprise a second haptic output device. The second automobile is in communication with the second haptic output device. In some embodiments, one or both automobiles may have blind spot detection enabled, in which an automobile can detect if another vehicle in its blind spot and output an associated alert to one or both drivers.

In some embodiments, upon the first user activating the left or right blinker, the first automobile may detect the presence of the second automobile in the first user's blind spot. Based on this detection, the first user's automobile may cause the first haptic output device to output a haptic effect to the first user. In some embodiments, the haptic effect may comprise a vibration. Further, in some embodiments, the magnitude of the vibration may change based on the distance between the first and second automobiles. For example, in one such embodiment, the first user may activate his left blinker signal. In such an embodiment, the first user's automobile may detect the presence of the second automobile in the first user's blind spot, determine that the distance between the first and second automobiles is half a meter, and output a haptic effect via the first haptic output device comprising an intense (e.g., high magnitude) vibration. In some embodiments, the haptic effect may be output on the side of the first user's steering wheel corresponding to the side of the first automobile on which the second automobile is detected. For example, if the second automobile is detected in the blind spot on the left side of the first automobile, the first automobile may output a haptic effect on the left side of the steering wheel.

Further, in some embodiments, the second automobile (via the second haptic output device) may output haptic effects based on the haptic effects sent to the first user in the first automobile. In some such embodiments, the second automobile may output a version of the haptic effect sent to the first user in which the location on the steering wheel that the first haptic effect was output is modified. For example, if the first haptic effect is output to the first user on the left side of the first user's steering wheel, the modified haptic effect may be output to the second user on the right side of the second user's steering wheel. In some embodiments, the second automobile may output a version of the first haptic effect sent to the first user in which the magnitude of the first haptic effect is modified. For example, in one embodiment, the second automobile outputs a version of the first haptic effect with the magnitude reduced by 50%. In some embodiments, how the first haptic effect is modified in order to generate the second haptic effect may change as the distance between the two automobiles changes. For example, in some embodiments, if the two automobiles are more than one meter apart, the second automobile may output a version of the first haptic effect modified such that its magnitude is reduced by 50%. As the two automobiles move closer together, the amount that the magnitude of the first haptic effect is reduced in order to generate the second haptic effect may decrease, so that by the time the two automobiles are within two-tenths of a meter, there is no magnitude reduction between the first haptic effect and the second haptic effect.

One of ordinary skill in the art will recognize that haptic effects may be shared among a plurality of automobiles, and that a multitude of other haptic triggering events (e.g., a change in the automobile's radio station, a GPS navigation event, pressing the brake or the gas pedal, the failure of an automobile component, or a low car battery), haptic output device configurations (e.g., placing the haptic output devices in the gear shifter, the break or gas pedal, or a car seat), and haptic effects (e.g, a perceived change in a coefficient of friction or a texture) are possible.

In some embodiments, the system may comprise a virtual training program. In some such embodiments, an expert may use a first electronic device, which comprises a first haptic output device, to perform a task (e.g., a surgery). As the expert performs the task, haptic effects may be delivered to the expert via the first haptic output device upon the occurrence of an event (e.g., if the expert touches a specific portion of the patient's body). In some embodiments, a student may use a second electronic device, which comprises a second haptic output device, to learn how to perform the task.

In some embodiments, the haptic content delivered to the first haptic output device is immediately transmitted to the second electronic device, which outputs the haptic effect. In other embodiments, the expert may be able to record the haptic content, as well as any video and/or audio content, for subsequent playback upon the occurrence of a playback event. In some such embodiments, the student can initiate the playback event by, for example, pressing a button, which delivers the saved haptic content, and any saved audio and/or video content, to the second electronic device. The second electronic device then delivers the haptic content to the second haptic output device, which outputs the haptic effects to the student.

In some embodiments, the second electronic device outputs modified versions of haptic content delivered to the first haptic output device. For example, in some embodiments, the second electronic device may output a version of an effect sent to the first haptic output device with the magnitude amplified. Such a magnitude increase may allow the student to more easily detect what might otherwise be a subtle, but important, haptic cues.

Illustrative Methods for Providing a Shared Haptic Experience

Figure 7:
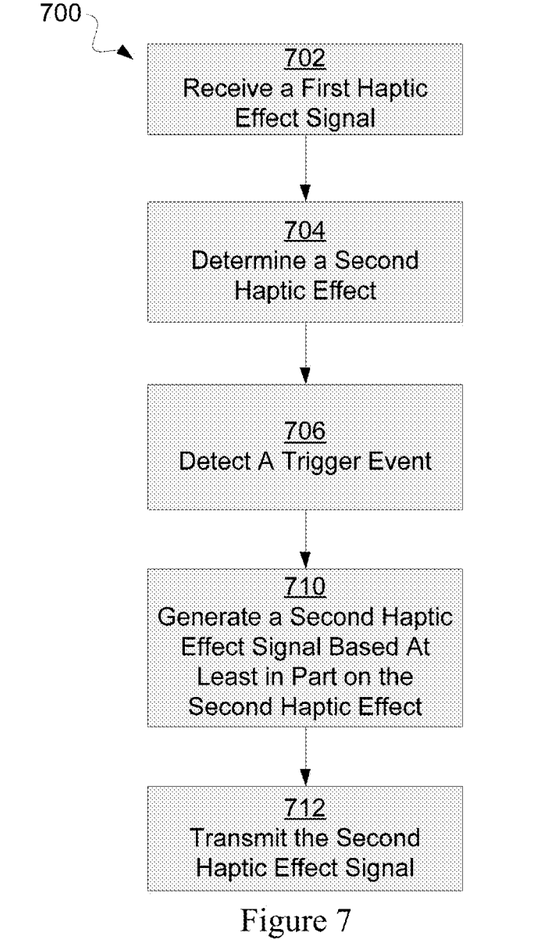
FIG. 7 is a flowchart showing a method for providing a shared haptic experience in one embodiment.

FIG. 7 is a flowchart showing a method for providing a shared haptic experience in one embodiment. In some embodiments, the steps in FIG. 7 may be implemented in program code that is executed by a processor, for example, the processor in a general purpose computer, a mobile device, or a server. In some embodiments, these steps may be implemented by a group of processors. The steps below are described with reference to components described above with regard to system 100 shown in FIG. 1.

Method 700 begins at step 702, with the receipt of a first haptic effect signal, the first haptic signal based at least in part on a haptic event (e.g., a user's character getting shot in a game, the completion of a level, driving a virtual vehicle over a bumpy virtual road). Detection module 124 or processor 102 may detect the first haptic effect signal.

The method 700 continues at step 704 when processor 102 determines a second haptic effect based at least in part on the first haptic effect and a characteristic external to the haptic event.

In some embodiments, the characteristic external to the haptic event may comprise a relative position of a first user with respect to a second user. In some embodiments, the relative positions of the first user and the second user comprise the physical positions of the first user and second user in real space. In some such embodiments, the physical positions of the first electronic device 122, controlled by the first user, and the second electronic device 120, controlled by the second user, may be used as reasonable approximations of the physical positions of the first user and the second user in real space. First and second electronic devices 118 and 120 may comprise one or more of an accelerometer, a gyroscope, an inclinometer, a global positioning system (GPS) unit, or another sensor for determining the positions of first electronic device 118 and second electronic device 120, respectively, in real space. In some such embodiments, processor 102 may receive sensor signals from a first accelerometer and a first gyroscope embedded within first the electronic device 118. Similarly, processor 102 may receive sensor signals from a second accelerometer and a second gyroscope embedded within the second electronic device 120. Based on these sensor signals, processor 102 may determine (via, for example, algorithms or a lookup table) the relative positions of the first electronic device 118 and the second electronic device 120 in real space. In such an embodiment, processor 102 may further determine the relative position of first electronic device 118 with respect to second electronic device 120 in real space.

In other embodiments, the relative positions of the first user and the second user comprise virtual positions of a virtual characters controlled by the first user and second user in a virtual environment. In such an embodiment, processor 102 may determine the relative position of a virtual character controlled by the first user and the relative position of a virtual character controlled by the second user directly from data about the virtual environment. For example, in some embodiments, processor 102 may sample network 110 data to track the location of the first user's virtual character and the second user's virtual character. Based on the sampled data, processor 102 may determine the virtual positions of the first user's virtual character and the second user's virtual character, respectively. In such an embodiment, processor 102 may further determine the relative position of first user's virtual character with respect to the second user's virtual character in the virtual environment.

In some embodiments, the characteristic external to the haptic event may comprise an environmental characteristic. In some embodiments, the environmental characteristic may be an environmental characteristic in real space. In such an embodiment, computing system 101 may comprise one or more sensors such as a temperature sensor, a humidity sensor, a camera, an accelerometer, a gyroscope, a sonar device, and/or other electronic devices configured to send sensor signals to processor 102. Processor 102 may determine an environmental characteristic directly from the sensor signal, or may apply the sensor signal data to an algorithm or a lookup table to determine the environmental characteristic. For example, in one such embodiment, processor 102 receives a sensor signal from a humidity sensor or temperature sensor and determines the humidity or temperature in the environment in which the first user and/or second user may be located. In another embodiment, processor 102 receives a sensor signal from a camera or sonar device and determines any environmental obstructions, like walls, in the environment in which the first user and/or second user may be located. In still another embodiment, processor 102 determines, based on a camera sensor signal, the medium in which the first user or second user is located, for example, if the first user is located in water. In yet another such embodiment, processor 102 receives sensor signals from a camera and determines whether or not the first user or second user is in a vehicle, the size of the vehicle, and/or the direction or velocity in which the vehicle is moving.

In other embodiments, the environmental characteristic may be a virtual environmental characteristic in a virtual environment. In such an embodiment, processor 102 may determine the environmental characteristic directly from data about the virtual environment. For example, in some embodiments, processor 102 samples network 110 data to track the presence or absence of environmental characteristics. Based on the sampled data, processor 102 may determine an environmental characteristic. In some embodiments, processor 102 may determine the virtual environmental characteristic directly from the sampled data, or may apply the sampled data to an algorithm or a lookup table to determine the virtual environmental characteristic. For example, in one such embodiment, processor 102 samples network data and applies an algorithm to determine the presence of an object, e.g. a virtual brick wall, in the virtual environment. Similarly, in some embodiments, processor 102 may sample network data and determine that the environmental characteristic comprises a physical principle, such as the Doppler effect.

In some embodiments, processor 102 may apply data about the characteristics of the first haptic effect to an algorithm in order to determine the strength, duration, location, and/or other characteristics of the second haptic effect. For example, processor 102 may use the strength and intensity characteristics of the first haptic effect to determine what second haptic effect to generate and through which actuators to generate it in the second electronic device 118. In some embodiments, the processor 102 may determine the second haptic effect based on the real or virtual relative position of the first user with respect to the second user, as determined in step 704, or any real or virtual environmental characteristics, as determined in step 706.

The processor 102 may rely on programming contained in haptic effect determination module 126 to determine the second haptic effect. For example, in some embodiments, haptic effect determination module 126 may determine the haptic effect to output, and which actuators to use to output the effect, based on algorithms. In some embodiments, such algorithms may assess the relative virtual position of a second user's virtual character with respect to a first user's virtual character. For example, in one embodiment, if a first user's virtual character is 40 meters northeast of the second user's virtual character, the processor 102 determines that the second haptic effect should be generated by actuators in the front right side of the second electronic device 120. Further, in such an embodiment, processor 102 may determine that the second haptic effect should be a substantially dampened version of the first haptic effect due to the 40-meter distance between the first user's virtual character and the second user's virtual character.

In some embodiments, processor 102 may determine the second haptic effect to output, and which actuators to use to output the second haptic effect, based on algorithms that assess the relative position of first electronic device 118 to second electronic device 120 in real space. For example, in one embodiment, if first electronic device 118 is a half meter northeast of second electronic device 120 in real space, the processor 102 determines that the second haptic effect should be generated by actuators in the front right side of the second electronic device 120. Further, in such an embodiment, processor 102 may determine that the second haptic effect should be not be dampened due to the mere half meter distance between the first electronic device 118 and the second electronic device 120.

In some embodiments, haptic effect determination module 126 may comprise a haptic actuator lookup table. In one such embodiment, the lookup table may comprise data with a haptic actuator of one type and a plurality of haptic actuators of different types that are capable of outputting similar haptic effects. For example, in one such embodiment, the lookup table may comprise data with an ERM and data with a plurality of other haptic devices capable of outputting similar haptic effects as an ERM, such as a LRA, piezoelectric actuator, an electric motor, or an electro-magnetic actuator. In such an embodiment, processor 102 may receive data indicating that the first haptic effect was generated in the first electronic device 118 by a signal of a specific intensity and duration designated for a specific type of haptic actuator, for example, an ERM. Based on this data, in one such embodiment, processor 102 may consult the lookup table to determine what hardware in second haptic output device 130 can be used as a substitute to generate a second haptic effect with characteristics similar to the first haptic effect. For example, if second haptic output device 130 does not contain an ERM but does contain an electric motor, processor 102 consults the lookup table and determines that the electric motor may be able to act as a suitable substitute to generate the second haptic effect.

In other embodiments, processor 102 may determine a default haptic effect. For example, in one such embodiment, second haptic output device 130 may not be able to generate a haptic effect, such as a vibration, due to lack of appropriate hardware. However, in such an embodiment, second haptic output device 130 may comprise an ESF actuator capable of varying the perceived coefficient of friction on the surface of second electronic device 120, which is the default haptic effect. Thus, in one such embodiment, processor 102 associates any first haptic effect comprising a vibration with a default second haptic effect comprising a perceived change in the coefficient of friction at the surface of second electronic device 120.

In some embodiments, processor 102 may determine a second haptic effect based on data in a lookup table. In some such embodiments, the lookup table may comprise data with environmental characteristics and a plurality of haptic effect modifications. For example, in one such embodiment, the lookup table may comprise data with a brick wall and a haptic effect modification, such as a decrease in haptic effect intensity by 30%. In such an embodiment, if there is a brick wall between a second user's virtual character and the first user's virtual character, processor 102 consults the lookup table and determines that the second haptic effect should be a modified version of the first haptic effect with 30% less intensity.

In some embodiments, processor 102 may make its determination based in part on other outside factors, such as the state of the gaming device. For example, in one such embodiment, processor 102 may make its determination partially on the amount of battery life the gaming device has. In such an embodiment, haptic effect determination module 126 may receive data indicating that the first haptic effect comprised a short, intense vibration. Because the battery life on the second electronic device 120, for example a smart phone, may be low, processor 102 may determine that a longer, but significantly less intense, vibration may achieve substantially the same effect without depleting the battery life to a detrimental level.

The method 700 continues at step 706 with the detection of a triggering event. Detection module 124 or processor 102 may detect the triggering event. In some embodiments, the trigger event may initiate storing of second haptic effects for subsequent playback. In some embodiments, the trigger event may initiate the sharing of haptic feedback between users. The triggering event may be user generated, such as by a button press, or software generated, such as when a virtual character is killed in a video game.

The method 700 continues when processor 102 generates a second haptic effect signal 710 and transmits the second haptic signal to the second haptic output device 712, which outputs the haptic effect. The second haptic effect signal is based at least in part on the second haptic effect. In some embodiments, the processor 102 may access drive signals stored in memory 104 and associated with particular haptic effects. In one embodiment, a signal is generated by accessing a stored algorithm and inputting parameters associated with an effect. For example, in such an embodiment, an algorithm may output data for use in generating a drive signal based on amplitude and frequency parameters. As another example, a second haptic signal may comprise data sent to an actuator to be decoded by the actuator. For instance, the actuator may itself respond to commands specifying parameters such as amplitude and frequency.

Additional Embodiments of Methods for Providing a Shared Haptic Experience

Figure 8:
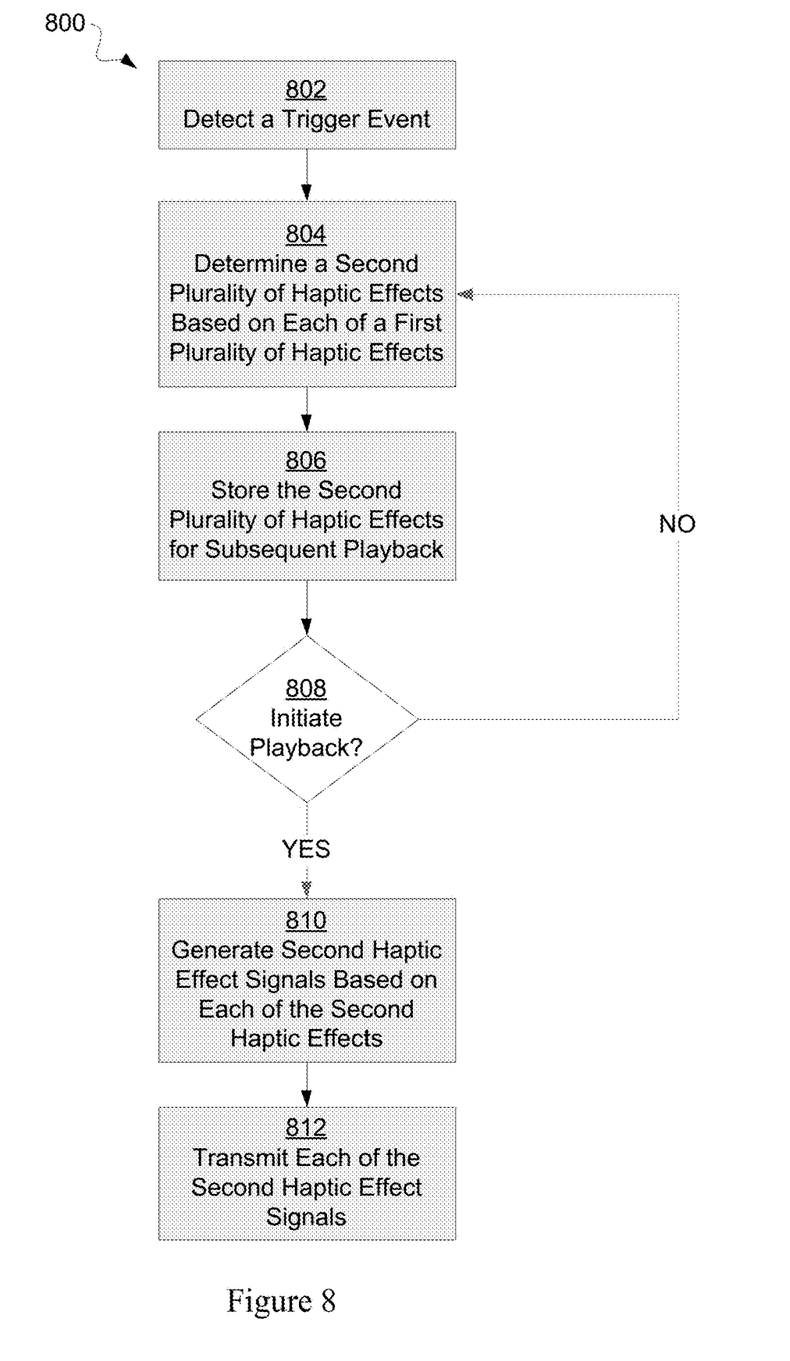
FIG. 8 is a flowchart showing another method for providing a shared haptic experience in one embodiment.

FIG. 8 is a flowchart showing another method for providing a shared haptic experience in one embodiment. In some embodiments, the steps in FIG. 8 may be implemented in program code that is executed by a processor, for example, the processor in a general purpose computer, a mobile device, or a server. In some embodiments, these steps may be implemented by a group of processors. The steps below are described with reference to components described above with regard to system 100 shown in FIG. 1.

Method 800 begins at step 802, with the detection of a triggering event indicating that a plurality of first haptic effects should be stored for later playback. Detection module 124 or processor 102 may detect the triggering event. The triggering event may be user generated, such as by a button press, or software generated, such as when a virtual character is killed in a video game.

The method 800 continues at step 804 when processor 102 determines a second plurality of haptic effects to generate based at least in part on each of a first plurality haptic effects. The processor 102 may rely on programming contained in haptic effect determination module 126 to determine the second plurality of haptic effects. In some embodiments, processor 102 may use any of the methods discussed with respect to FIG. 7 to determine each of the second plurality of haptic effects.

The method 800 continues at step 806 when processor 102 causes the second plurality of haptic effects to be stored in memory 104 for subsequent playback. Processor 102 may store the second plurality of haptic effects by type, name, duration, intensity, timestamp, or any other characteristics such that they can later be recalled and output in a sequential, or in some embodiments nonsequential, manner.

Method 800 continues at step 808 where system 100 waits for an event indicating the saved plurality of second haptic effects should be played back. The event may be user generated, such as by pressing a button, or software generated, such as by the death of a virtual character in a video game. If the playback event occurs, the method 800 continues to step 810. Otherwise, the method 800 returns to steps 804 and 806, where it continues to determine and store the second plurality of haptic effects.

In response to the playback event, the method 800 continues at steps 810 and 812 where processor 102 generates a second plurality of haptic effect signals based on the stored second plurality of haptic effects and transmits each of the second plurality of haptic signals to the second haptic output device 130, which outputs the haptic effects. In some embodiments, the processor 102 may access drive signals or algorithms stored in memory 104 and associated with particular haptic effects to generate the second plurality of haptic effect signals. In some embodiments, processor 102 may use any of the methods discussed with respect to FIG. 7 to generate and transmit each of the second plurality of haptic signals to the second haptic output device 130.

Advantages of a Shared Haptic Experience

There are numerous advantages of providing shared haptic experiences. Such systems may provide more compelling gaming experiences by allowing users to feel the sensations their fellow game players feel. For example, if a first user's gaming device vibrates because a virtual character controlled by the first user is shot, a second user's gaming device may output substantially the same, or a modified version of, the vibration, providing a more interactive experience. This may increase overall user satisfaction.

In some embodiments, sharing haptic feedback among users may lead to improved collaboration when performing tasks in a virtual environment. This is because users will have a better understanding of what actions their teammates are taking by feeling the same, or modified versions of, the associated haptic responses. For example, two users may be playing a game in which they have to collaborate to achieve a military objective. The first user may be controlling a virtual gunner character, while the second user is controlling a virtual medic character. As the first user manipulates his or her virtual character to take part in an attack on a military stronghold, the first user's gaming device may vibrate if his or her virtual gunner character gets shot. In some embodiments, this haptic content may be modified and shared with the second user, causing the second user's gaming device to also vibrate. For example, in such an embodiment, if the gunner character is shot 500 meters northwest of the medic character's position, the second user feels a weak vibration on the front left side of his or her controller. This may indicate to the second user how far away, and in what direction, the first user's character may be located so he may render aid.

Further, some embodiments may improve virtual training programs. For example, an expert may be able to play a videogame or perform a task in a virtual environment and save his audio, video, and, in some embodiments, haptic content. In such an embodiment, a novice may be able to play back the saved content and learn how to play the game or perform the task. Playing back haptic content, in addition to audio and video, may make such learning more effective.

GENERAL CONSIDERATIONS

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a processor; and
   a non-transitory computer readable medium in communication with the processor, the non-transitory computer readable medium comprising program code that is executable by the processor to cause the processor to:
   receive a first haptic effect signal from a first electronic device, the first haptic effect signal based at least in part on a haptic event and associated with a first haptic effect to be output by a first haptic output device coupled to the first electronic device;
   determine a type of the first haptic output device;

select a second haptic output device from among a plurality of haptic output devices coupled to a second electronic device, the second electronic device being separate from the first electronic device, wherein the second haptic output device is selected based on the type of the first haptic output device, and wherein the second haptic output device is usable to output a second haptic effect;

determine the second haptic effect based at least in part on the first haptic effect and a type of the second haptic output device;

generate a second haptic effect signal based at least in part on the second haptic effect; and transmit the second haptic effect signal to the second haptic output device, wherein the second haptic output device is configured to receive the second haptic effect signal and output the second haptic effect.

2. The system of claim 1, wherein the second haptic effect is further based on at least one characteristic that is independent of the haptic event.

3. The system of claim 2, wherein the at least one characteristic comprises an environmental characteristic.

4. The system of claim 3, wherein the environmental characteristic comprises one of: an ambient temperature, a characteristic of a barrier, a humidity level, or a density of a medium.

5. The system of claim 4, wherein the environmental characteristic comprises a virtual characteristic.

6. The system of claim 2, wherein the non-transitory computer readable medium further comprises program code that is executable by the processor to cause the processor to determine the at least one characteristic that is independent of the haptic event based on a sensor signal indicating a relative position of a first user in real space with respect to a second user.

7. The system of claim 2, wherein the at least one characteristic that is independent of the haptic event comprises a virtual position of a virtual character in a virtual environment.

8. The system of claim 2, wherein the non-transitory computer readable medium further comprises program code that is executable by the processor to cause the processor to determine the at least one characteristic that is independent of the haptic event based on a sensor signal indicating a relative position of a vehicle in which a first user is traveling with respect to a second user.

9. The system of claim 2, wherein the at least one characteristic comprises a virtual size of a virtual character.

10. The system of claim 2, wherein the at least one characteristic further comprises a Doppler effect.

11. The system of claim 2, further comprising program code that is executable by the processor to cause the processor to determine the at least one characteristic based on a distance between a game system and either the first electronic device or the second electronic device.

12. The system of claim 2, wherein the at least one characteristic comprises a relative size of a first virtual character to a second virtual character.

13. The system of claim 1, wherein the non-transitory computer readable medium further comprises instructions executable by the processor to cause the processor to detect a trigger event indicating that the first haptic effect should be stored for subsequent playback.

14. The system of claim 13, wherein the trigger event comprises a software-generated event.

15. The system of claim 13, wherein the trigger event comprises a button press event.

16. The system of claim 1, wherein the non-transitory computer readable medium further comprises program code executable by the processor to cause the processor to select the second haptic output device from among the plurality of haptic output devices based on a relationship between the first haptic output device and the second haptic output device in a haptic actuator lookup table.

17. The system of claim 16, wherein the haptic actuator lookup table comprises relationships between different types of haptic output devices.

18. The system of claim 1, wherein the second haptic output device comprises plurality of actuators for outputting the second haptic effect, and wherein the non-transitory computer readable medium further comprises instructions executable by the processor to cause the processor to:

select a particular actuator of the plurality of actuators based on a sensor signal indicating a relative position between two objects.

19. The system of claim 1, wherein:

the first haptic effect comprises a first plurality of haptic effects;

the second haptic effect comprises a second plurality of haptic effects; and wherein the non-transitory computer readable medium further comprises instructions executable by the processor to cause the processor to:

determine the second plurality of haptic effects based on the first plurality of haptic effects; and store the second plurality of haptic effects for subsequent playback.

20. The system of claim 1, wherein the first haptic output device comprises a first actuator and a second haptic output device comprises a second actuator of a type that is different than the first actuator, and wherein the type of the first haptic output device comprises the type of the first actuator.

21. The system of claim 1, wherein the first electronic device is of a different type than the second electronic device, and wherein the first haptic effect is of a different type than the second haptic effect.

22. The system of claim 1, wherein determining the second haptic effect comprises determining at least one of a type, an amplitude, or a frequency of the second haptic effect.

23. The system of claim 1, wherein determining the second haptic effect comprises determining at least one of a waveform or a duration of the second haptic effect.

24. A method comprising:

receiving, by an electronic device, a first haptic effect signal from another electronic device, the first haptic effect signal based at least in part on a haptic event and associated with a first haptic effect to be output to a first user by a first haptic output device coupled to the other electronic device;

determining, by the electronic device, a type of the first haptic output device;

selecting, by the electronic device, a second haptic output device from among a plurality of haptic output devices coupled to the electronic device, wherein the second haptic output device is selected based on the type of the first haptic output device;

determining, by the electronic device, a second haptic effect based at least in part on the first haptic effect and a type of the second haptic output device;

outputting, by the electronic device, the second haptic effect to a second user via the second haptic output device.

25. The method of claim 24, wherein the second haptic effect is further based at least in part on at least one characteristic that is independent of the haptic event.

26. The method of claim 25, wherein the at least one characteristic comprises an environmental characteristic.

27. The method of claim 26, wherein the environmental characteristic comprises one of: an ambient temperature, a characteristic of a barrier, a humidity level, or a density of a medium in which the second user is located.

28. The method of claim 25, wherein the at least one characteristic that is independent of the haptic event comprises a relative position of the second user in real space with respect to the first user or a virtual position of a virtual character controlled by the second user in a virtual environment.

29. The method of claim 24, further comprising:
detecting a trigger event indicating that the first haptic effect should be stored for subsequent playback.

30. The method of claim 29, wherein the trigger event comprises a user input or a software-generated event.

31. The method of claim 24, wherein:
the first haptic effect comprises a first plurality of haptic effects;
the second haptic effect comprises a second plurality of haptic effects; and
further comprising:
determining the second plurality of haptic effects based on the first plurality of haptic effects; and
storing the second plurality of haptic effects for subsequent playback.

32. A non-transitory computer readable medium comprising program code, which when executed by a processor of an electronic device is configured to cause the processor to:
receive a first haptic effect signal from another electronic device, the first haptic effect signal based at least in part on a haptic event and associated with a first haptic effect to be output by a first haptic output device coupled to the other electronic device;
determine a type of the first haptic output device;
select a second haptic output device from among a plurality of haptic output devices coupled to the electronic device, wherein the second haptic output device is selected based on the type of the first haptic output device, and wherein the second haptic output device is usable to output a second haptic effect;
determine the second haptic effect based at least in part on the first haptic effect and a type of the second haptic output device;
generate a second haptic effect signal based at least in part on the second haptic effect; and
transmit the second haptic effect signal to the second haptic output device to cause the second haptic output device to output the second haptic effect.

33. The non-transitory computer readable medium of claim 32, wherein the second haptic effect is further based at least in part on at least one characteristic that is independent of the haptic event.

34. The non-transitory computer readable medium of claim 33, further comprising program code that is executable by the processor to cause the processor to determine the at least one characteristic that is independent of the haptic event based on a sensor signal indicating a position of a first user in real space or a virtual position of a virtual character in a virtual environment.

35. The non-transitory computer readable medium of claim 33, wherein the at least one characteristic comprises an environmental characteristic.

36. The non-transitory computer readable medium of claim 32, further comprising program code which when executed by a processor is configured to cause the processor to detect a trigger event indicating that the first haptic effect should be stored for subsequent playback.

37. The non-transitory computer readable medium of claim 36, wherein the trigger event comprises a user input or a software-generated event.

38. The non-transitory computer readable medium of claim 32, wherein:
the first haptic effect comprises a first plurality of haptic effects;
the second haptic effect comprises a second plurality of haptic effects; and
which when executed by a processor is further configured cause the processor to:
determine the second plurality of haptic effects based on the first plurality of haptic effects; and
store the second plurality of haptic effects for subsequent playback.

* * * * *